United States Patent
Abe et al.

(10) Patent No.: US 6,751,177 B1
(45) Date of Patent: Jun. 15, 2004

(54) SIGNAL PROCESSOR

(75) Inventors: Kazutaka Abe, Kadoma (JP);
Masaharu Matsumoto, Katano (JP);
Akihisa Kawamura, Hirakata (JP);
Masatoshi Shimbo, Mino (JP); Naoki Ejima, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/530,540

(22) PCT Filed: Sep. 1, 1999

(86) PCT No.: PCT/JP99/04750

§ 371 (c)(1),
(2), (4) Date: Jun. 30, 2000

(87) PCT Pub. No.: WO00/14738

PCT Pub. Date: Mar. 16, 2000

(30) Foreign Application Priority Data

Sep. 2, 1998 (JP) ............................................. 10-248309

(51) Int. Cl.[7] .................................................. G11B 5/09
(52) U.S. Cl. .................. 369/59.21; 341/61; 375/240.11
(58) Field of Search ............................ 382/240; 369/59; 327/552; 341/61

(56) References Cited

U.S. PATENT DOCUMENTS 6,000,834 A * 12/1999 Duan ......................... 708/313

6,208,671 B1 * 3/2001 Paulos et al. ............... 370/545

FOREIGN PATENT DOCUMENTS

| EP | 0798866 | 10/1997 |
| EP | 0896498 | 2/1999 |
| JP | 8-65169 | 3/1996 |
| JP | 9-261068 | 10/1997 |
| JP | 11-53841 | 2/1999 |
| WO | 97/19520 | 5/1997 |

OTHER PUBLICATIONS

WO 97/19520 to Dijkmans et al. , "Digital Transmission System for Transmitting a Digital Audio Signal Being in the Form of Samples of a Specific Wordlength and Occurring at a Specific Rate", publication date: May 29, 1997.*

* cited by examiner

*Primary Examiner*—David Hudspeth
*Assistant Examiner*—Glenda Rodriguez
(74) *Attorney, Agent, or Firm*—Parkhurst & Wendel, L.L.P.

(57) ABSTRACT

When, through a multi-speaker of a DVD audio system, signals are recorded/reproduced using a sampling frequency different for every channel, the quantity of calculation of a filter circuit is reduced. Up-sampling information about whether or not the sampling is carried out before the up-sampling by up-sampling means (2a, 2b) is acquired by up-sampling information detecting means (6). The signal up-sampled is filtered by a halfband filter circuit (3), subjected to loss-less compression, and recorded on a recording medium (8).

7 Claims, 5 Drawing Sheets

SIGNAL PROCESSOR

TECHNICAL FIELD

The present invention relates to a signal processing apparatus and, more particularly to a signal processing apparatus which reduces operation amount in decoding when reproducing a plurality of signals of different sampling frequencies.

BACKGROUND ART

According to a DVD audio standard for a DVD-based audio disc, its storage capacity is 4.7 GB. DVD audio recording scheme is PCM, like CD or DVD-ROM and, as for its specification, a sampling frequency indicative of fidelity to original sound with which audio is recorded is 192 KHz at maximum, which is about 4.3 times as high as that (44.1 KHz) of the CD. This enables to record audio of highest quality.

FIG. 3 is a diagram showing conception of a sound field formed by reproduced DVD audio. In the figure, reference numeral 40 denotes a center speaker, and 41a and 41b denote left and right speakers placed at the left of the center speaker 40 and at the right of the same, respectively. Reference numerals 42a and 42b denote left and right surround speakers placed behind an auditor, for increasing realism, and 43 denotes a speaker called "sub-woofer", for outputting relatively low sound. According to the DVD audio standard, reproduction can be performed by using 6 speakers (6 channels) even when sampling frequencies and the numbers of quantization bits of respective channels differ from each other. For instance, in configuration shown in FIG. 3, the center speaker 40 and the left and right channel speakers 41a and 41b for which relatively high sound quality is demanded, perform reproduction at 96 KHz, while the left and right surround speakers 42a and 42b and the sub-woofer 43 for which relatively high sound quality is not demanded, perform reproduction at 48 KHz.

By the way, when data of respective channels are to be recorded at 96 KHz and in 24 bits for data of 6 channels, a standard for a maximum transfer rate would be exceeded. Accordingly, it becomes necessary to compress data when recorded. A compression method includes irreversible compression using a psychoacoustic model for use in MPEG or AC3, and "Lossless compression" which is capable of completely restoring data to the state before compression by employing entropy coding as reversible compression, such as Huffman coding. In order to reproduce audio of high quality with fidelity to original sound as described above, the Lossless compression is desirably employed. This enables to reproduce audio of high quality of 6 channels at 96 KHz and in 24 bits, in data transfer of the DVD audio. On the other hand, even when the standard for the maximum transfer rate is not exceeded, the Lossless compression enables to record data of 4.7 GB for a long time period.

FIG. 4 is a block diagram showing a conventional DVD audio recording apparatus. For the sake of simplicity, 3 channels are illustrated, although 6 channels are actually used. In FIG. 4, reference numerals 51a and 51b denote upsampling means which receive signals of the channels 2 and 3 at sampling frequencies of 48 KHz, and adapt their respective sampling frequencies to 96 KHz for the channel 1. Reference numeral 50 denotes a timing delay unit for delaying the signal of the channel 1 while the signals of the channel 2 and 3 are upsampled, and 52 denotes a filter circuit for filtering the upsampled signals of the channels 2 and 3 and performing interpolation for them so that they are smoothed. Reference numeral 54 denotes Lossless compression means for performing reversible compression of the signals of the channels 2 and 3 which passed through the filter circuit 52 and the signal of the channel 1 delayed by the delay unit 50. Reference numeral 53 denotes format transformation means for transforming a Lossless-compressed signal into data having a predetermined format which can be written to a recording medium 56, and 55 denotes recording means for recording the compressed data into the recording medium 56.

To upsample the sampling frequencies of the signals of the channels 2 and 3 from 48 KHz to 96 KHz, respectively, with the above-mentioned construction, the upsampling means 51a and 51b insert a predetermined number of "zeros" into data so that the sampling frequencies are twice higher (48×2=96), and then a filter circuit 52 having a given factor in a subsequent stage replaces the inserted "zero" samples with :samples used for smooth interpolation. To be specific, the upsampling process for inserting the samples having "zero" values into the data of the signals of the channels 2 and 3 is performed so that the sample having the "zero" value is placed in every other sample of the data. While the signals of the channels 2 and 3 are upsampled, the signal of the channel 1 is delayed by the delay unit 50. Instead of the above "0" insertion, processing performed by the upsampling means 51a and 51b may be a sample holding process which holds a predetermined number of previous sample data or an interpolation process using straight lines rather than "zeros". Here, in the sample holding process, the data of the signals of channels 2 and 3 are interpolated so that after each of the samples constituting that data, a sample having the same value as that sample is placed. For the filter circuit 52, a low pass filter can be realized by a filter such as an FIR (Filter Impulse Response) or an IIR (Infinite Impulse Response). The filter circuit 52 filters the signals output from the upsampling means 51a and 51b by using the above filter.

The outputs of the filter circuit 52 and the output of the delay unit 50 are processed by the Lossless compression means 54 and then processed by the format transformation means 53, and the resulting data is written to the recording medium (DVD audio disc) 56 by using the recording means 55.

To read so created data from the recording medium 56 to reproduce audio, a reproducing apparatus shown in FIG. 5 is used. In FIG. 5, reference numeral 60 denotes reading means for reading data from the recording medium 56, and reference numeral 62 denotes format inverse-transformation means for transforming the read data (Lossless-compressed) into a signal (Lossless-compressed) having a format of reproducible audio signal. Reference numeral 61 denotes compressed-data decompression means for decompressing the data (Lossless-compressed) which has been subjected to the format inverse-transformation, and reference numeral 63 denotes a filter circuit for downsampling predetermined decompressed data as required.

To reproduce the predetermined data decompressed by the compressed-data decompression means 61 at a sampling frequency of 48 KHz downsampled from 98 KHz, with the above-described construction, the filter circuit 63 downsamples this data.

In the conventional signal processing apparatus so constructed, the filter circuit temporarily equalizes the sampling frequencies of the plurality of signals at a recording time, to be recorded in the recording medium, while the filter circuit at a reproducing end changes the sampling frequencies of the predetermined channels into the predetermined sampling frequencies, to output the signals.

In this case, when high precision is required for the filter circuits used in the above processing, the amount of operation therein is noticeably increased, and burden on hardware is correspondingly increased. In addition, the processed signals are reproduced unsatisfactorily.

The present invention is directed to solving the above problem, and an object of the present invention is to provide a signal processing apparatus which is capable of reducing operation amount in filter circuits when processing a plurality of signals of different sampling frequencies, and reproducing all the signals completely.

DISCLOSURE OF THE INVENTION

According to aspect 1 of the present invention, there is provided a signal processing apparatus for encoding a plurality of channel signals of different sampling frequencies to be recorded in a recording medium, comprising: upsampling means for transforming a sampling frequency of a channel signal having a small sampling frequency among the plurality of channel signals of different sampling frequencies into a sampling frequency of a channel signal having a large sampling frequency; a half band filter that receives the channel signal upsampled by the upsampling means as an input; and format transformation means for transforming the channel signal processed by the half band filter and the channel signal having the large sampling frequency into signals having predetermined formats.

According to aspect 2 of the present invention, the signal processing apparatus of aspect 1, further comprises: data compression means for performing Lossless compression to the signal processed by the half band filter and the channel signal having the large sampling frequency.

According to aspect 3 of the present invention, the signal processing apparatus of aspect 1, further comprises: upsampling information description means for describing upsampling information indicating that a sample of the channel signals processed by the half band filter is a sample before the upsampling, into a predetermined area of the recording medium.

According to aspect 4 of the present invention, there is provided a signal processing apparatus for performing decoding to reproduce data recorded in a recording medium, said data being recorded in the recording medium after a sampling frequency of at least one channel signal among a plurality of channel signals of different sampling frequencies is upsampled, and the resulting channel signal is processed by a half band filter and then transformed into a signal having a predetermined format, comprising: data reading means for reading data from the recording medium; format inverse-transformation means for inversely transforming the data read from the data reading means into a signal having a predetermined format; downsampling means for downsampling a sampling frequency of a specified signal among the format inverse-transformed signals; and downsampling control means for instructing the downsampling means to intermittently read the specified signal among the format inverse-transformed signals.

According to aspect 5 of the present invention, in the signal processing apparatus of aspect 4, the signal read by the data reading means is completely reproducible data which has been subjected to Lossless compression, and the apparatus further comprises: data decompression means for decompressing compressed data into data before compression after it is subjected to format inverse-transformation.

According to aspect 6 of the present invention, the signal processing apparatus of aspect 4, further comprises: upsampling information extraction means for detecting upsampling information indicating that data is a sample before upsampling performed by the upsampling means when detecting the upsampled signal data; and downsampling control means for instructing the downsampling means to intermittently read the data according to the information.

According to aspect 7 of the present invention, in the signal processing apparatus of aspect 6, the upsampling information is recorded in a predetermined area of the recording medium as an information indicating data is a sample before upsampling performed by the upsampling means, and the downsampling means reads one of odd-numbered data and even-numbered data according to the upsampling information, thereby to perform said intermittent reading.

As described above, according to aspect 1 of the present invention, there is provided a signal processing apparatus for encoding a plurality of channel signals of different sampling frequencies to be recorded in a recording medium, comprising: upsampling means for transforming a sampling frequency of a channel signal having a small sampling frequency among the plurality of channel signals of different sampling frequencies into a sampling frequency of a channel signal having a large sampling frequency; a half band filter that receives the channel signal upsampled by the upsampling means as an input; and format transformation means for transforming the channel signal processed by the half band filter and the channel signal having the large sampling frequency into signals having predetermined formats. Therefore, the operation amount of the filter in upsampling can be reduced about by half.

According to aspect 2 of the present invention, the signal processing apparatus of aspect 1, further comprises: data compression means for performing Lossless compression to the signal processed by the half band filter and the channel signal having the large sampling frequency. Therefore, much data can be recorded in the recording medium without degrading sound quality.

According to aspect 3 of the present invention, the signal processing apparatus of aspect 1, further comprises: upsampling information description means for describing upsampling information indicating that a sample of the channel signal processed by the half band filter is a sample before the upsampling, into a predetermined area of the recording medium. Therefore, when reproducing a signal from the recording medium later, an original shape of the upsampled signal can be recognized, and data can be read intermittently with reliability.

According to aspect 4 of the present invention, there is provided a signal processing apparatus for performing decoding to reproduce data recorded in a recording medium, said data being recorded in the recording medium after a sampling frequency of at least one channel signal among a plurality of channel signals of different sampling frequencies is upsampled, and the resulting channel signal is processed by a half band filter and then transformed into a signal having a predetermined format, comprising: data reading means for reading data from the recording medium; format inverse-transformation means for inversely transforming the data read from the data reading means into a signal having a predetermined format; downsampling means for downsampling a sampling frequency of a specified signal among the format inverse-transformed signals; and downsampling control means for instructing the downsampling means to intermittently read the specified signal among the format inverse-transform ed signals. Therefore, downsampling can be implemented by only performing intermittent reading, and thereby a filter at a reproducing end is dispensed with, which significantly reduces operation amount.

According to aspect 5 of the present invention, in the signal processing apparatus of aspect 4, the signal read by the data reading means is completely reproducible data which has been subjected to Lossless compression, and the apparatus further comprises: data decompression means for decompressing compressed data into data before compression after it is subjected to format inverse-transformation. Therefore, when reproducing the compressed data, its sound quality is not degraded at all.

According to aspect 6 of the present invention, the signal processing apparatus of aspect 4, further comprises: upsampling information extraction means for detecting upsampling information indicating that data is a sample before upsampling performed by the upsampling means when detecting the upsampled signal data; and downsampling control means for instructing the downsampling means to intermittently read the data according to the information. Therefore, an original shape of the upsampled signal can be recognized, and data can be read intermittently with reliability.

According to aspect 7 of the present invention, in the signal processing apparatus of aspect 6, the upsampling information is recorded in a predetermined area of the recording medium as an information indicating data is a sample before upsampling performed by the upsampling means, and the downsampling means reads one of odd-numbered data and even-numbered data according to the upsampling information, thereby to perform said intermittent reading. Therefore, the signal can be easily downsampled with a simple circuit.

BEST MODE FOR CARRYING OUT THE INVENTION

Embodiment 1

Figure 1:
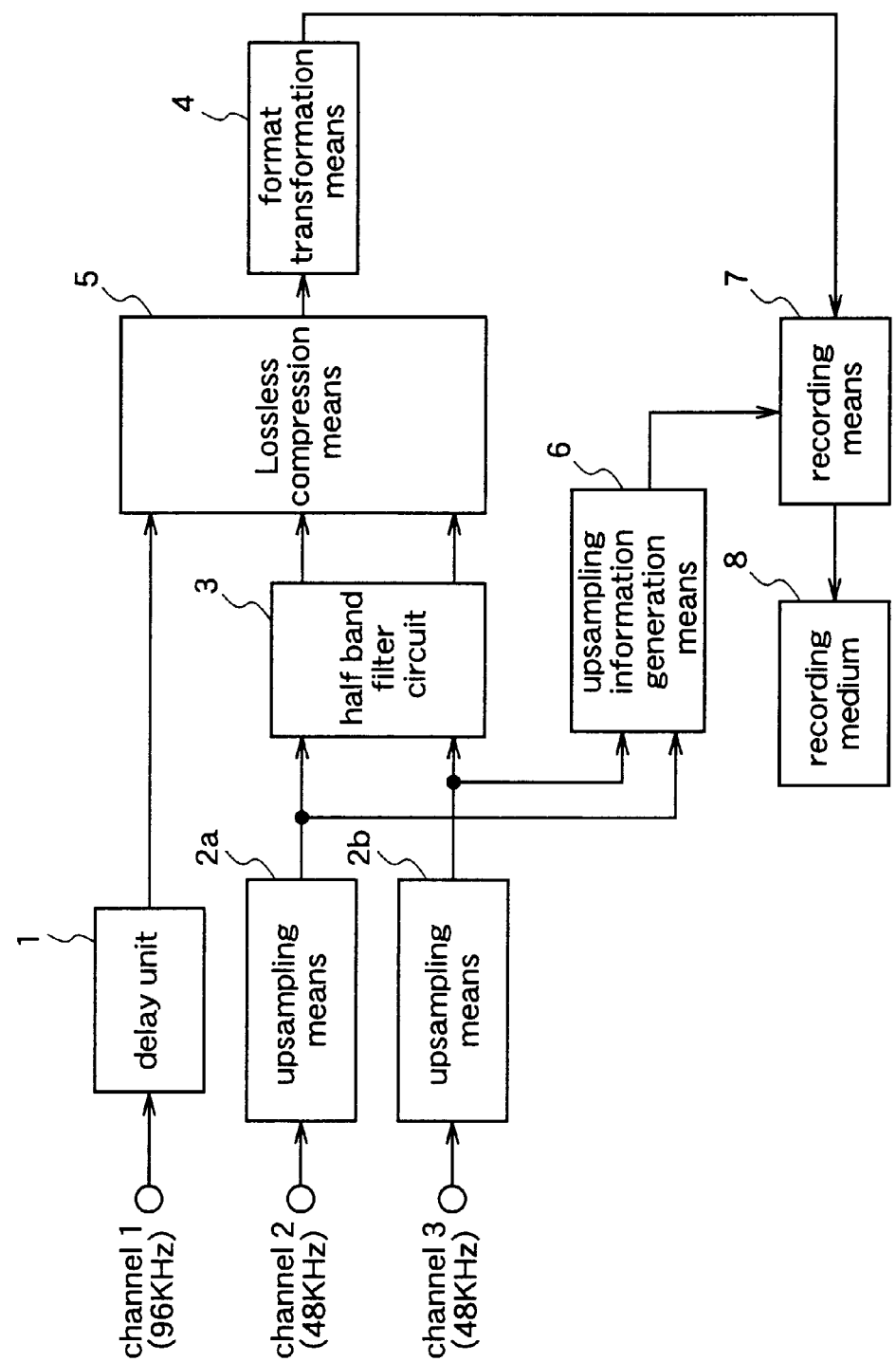
FIG. 1 is a block diagram principally showing an encoding circuit of a signal processing apparatus according to a first embodiment of the present invention.

FIG. 1 is a block diagram showing an encoding circuit of a signal processing apparatus according to a first embodiment of the present invention. In FIG. 1, reference numerals 2a and 2b denote upsampling means which receive signals of channels 2 and 3 at sampling frequencies of 48 KHz and increase the sampling frequencies, and reference numeral 1 denotes a timing delay unit for delaying a signal of a channel 1 while the signals of the channels 2 and 3 are upsampled. Reference numeral 5 denotes a half band filter circuit for filtering the upsampled signals of the channels 2 and 3 to eliminate unnecessary band signals of the channels 2 and 3, resulting from processing by the upsampling means 2a and 2b, and reference numeral 3 denotes data compression means (Lossless compression means) for performing reversible compression of the signals of the channels 2 and 3 which passed through the half band filter circuit 3 and the signal of the channel 1 output from the delay unit 1. Reference numeral 4 denotes format transformation means for transforming compressed data into data having a prescribed format writable to a recording medium 8, and reference numeral 7 denotes recording means for recording the compressed data into the recording means 8. Upsampling information generation means 6 generate upsampling information about upsampling performed by the upsampling means 2a and 2b and output the upsampling information to the recording means 7. In the above construction, the upsampling information generation means 6 and the recording means 7 constitute upsampling information description means.

To upsample the sampling frequencies of the signals of the channels 2 and 3 from 48 KHz to 96 KHz with the above construction, the upsampling means 2a and 2b insert a predetermined number of "zeros" into data corresponding to the signals of channels 2 and 3 so that the sampling frequencies are twice higher (48×2=96), respectively. Meanwhile, the signal of the channel 1 is delayed by the delay unit 1 during a specified time period. Then, the half band filter circuit 3 in a subsequent stage performs interpolation of the signals of the channels 2 and 3. The half band filter has an FIR (Finite Impulse Response) factor, for example, (C, 0, B, 0, A, 1, A, 0, B, 0, C), which are arranged symmetrically such that two factors are adjacent to a reference value "1" placed at the center thereof, and from each of the two factors, "0" and a factor alternately appear. With the use of this, the upsampled data is processed.

Also, the upsampling information generation means 6 generates the upsampling information indicating whether or not data is sample data before upsampling performed by the upsampling means 2a and 2b.

So processed data is output from the half band filter circuit 3, and processed by the Lossless compression means 5 and then processed by the format transformation means 4, to be written on the recording medium (DVD audio disc) 8 by using the recording means 7. (As an example of the above format transformation, there is transformation into a Pack/Packet structure according to an MPEG standard system.) The recording means 7 writes the compressed data and the upsampling information (indicating whether or not the data is sample data before upsampling and the like) generated by the upsampling information generation means 6 into predetermined areas of the recording medium 8. The predetermined areas can be private headers according to DVD audio standard.

Figure 2:
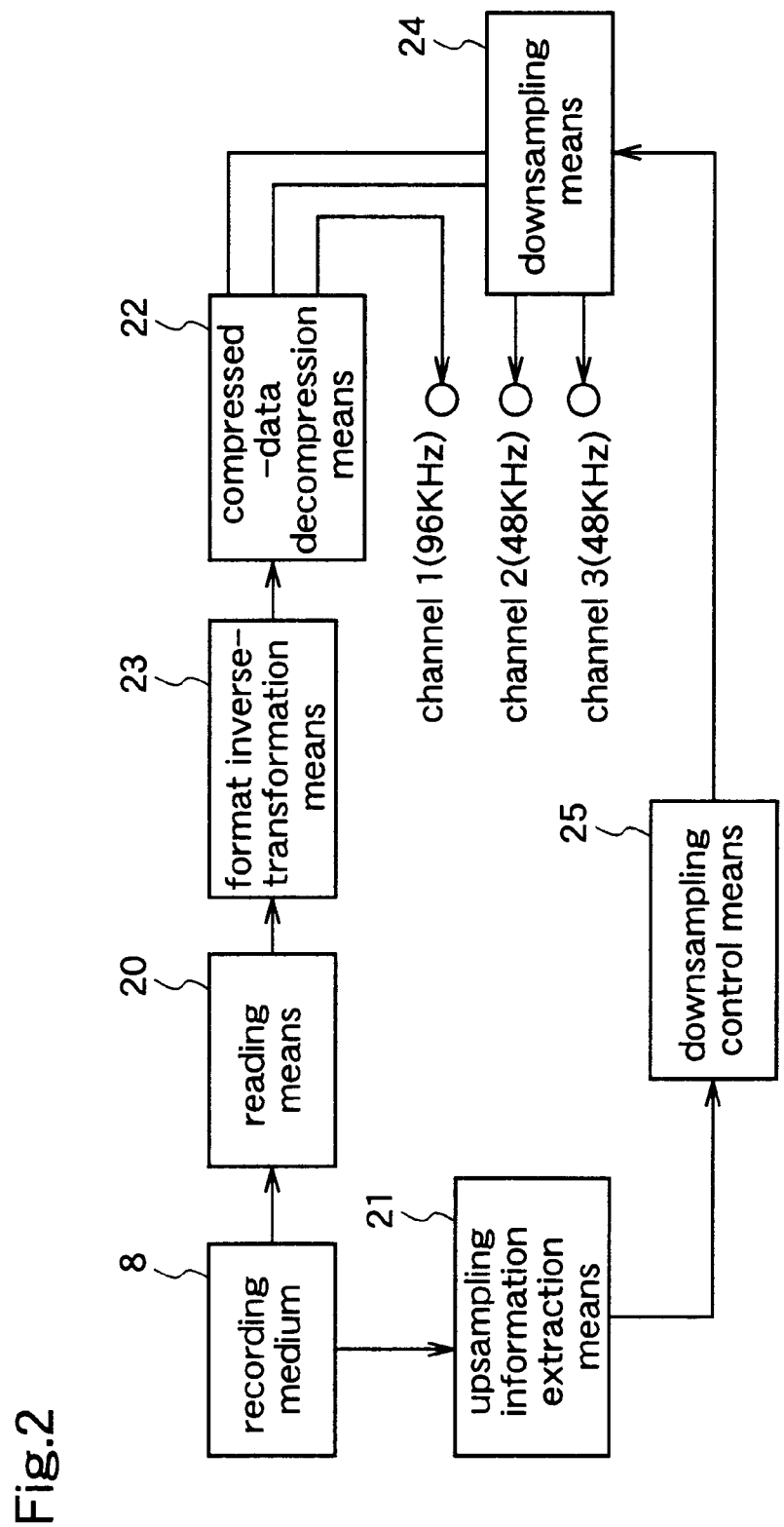
FIG. 2 is a block diagram principally showing a decoding circuit of the signal processing apparatus of the first embodiment.
Figure 3:
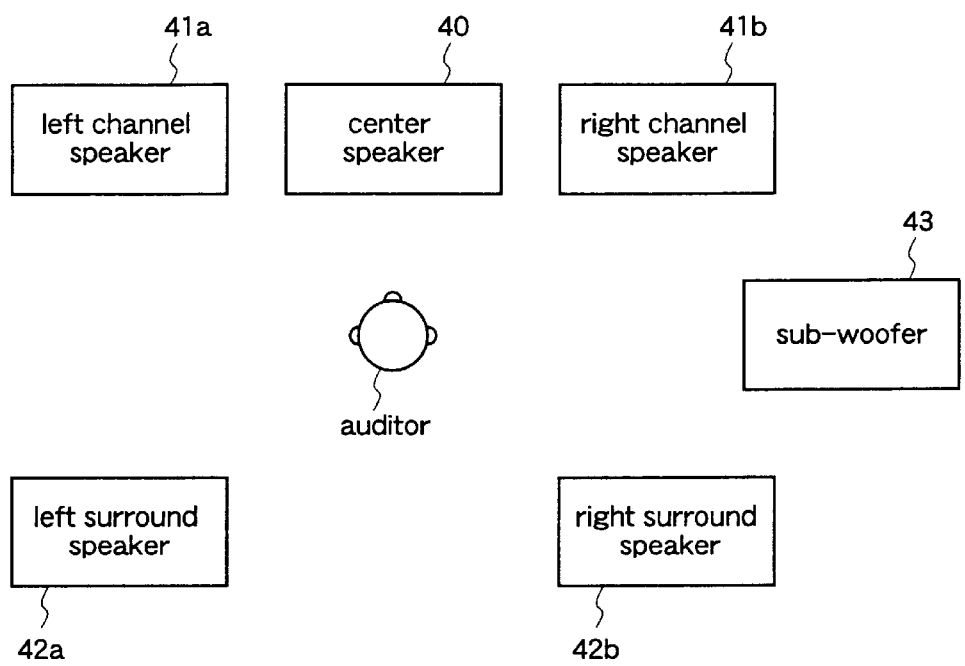
FIG. 3 is a diagram showing conception of reproduction using 6 speakers of multi channels according to a DVD audio standard.
Figure 4:
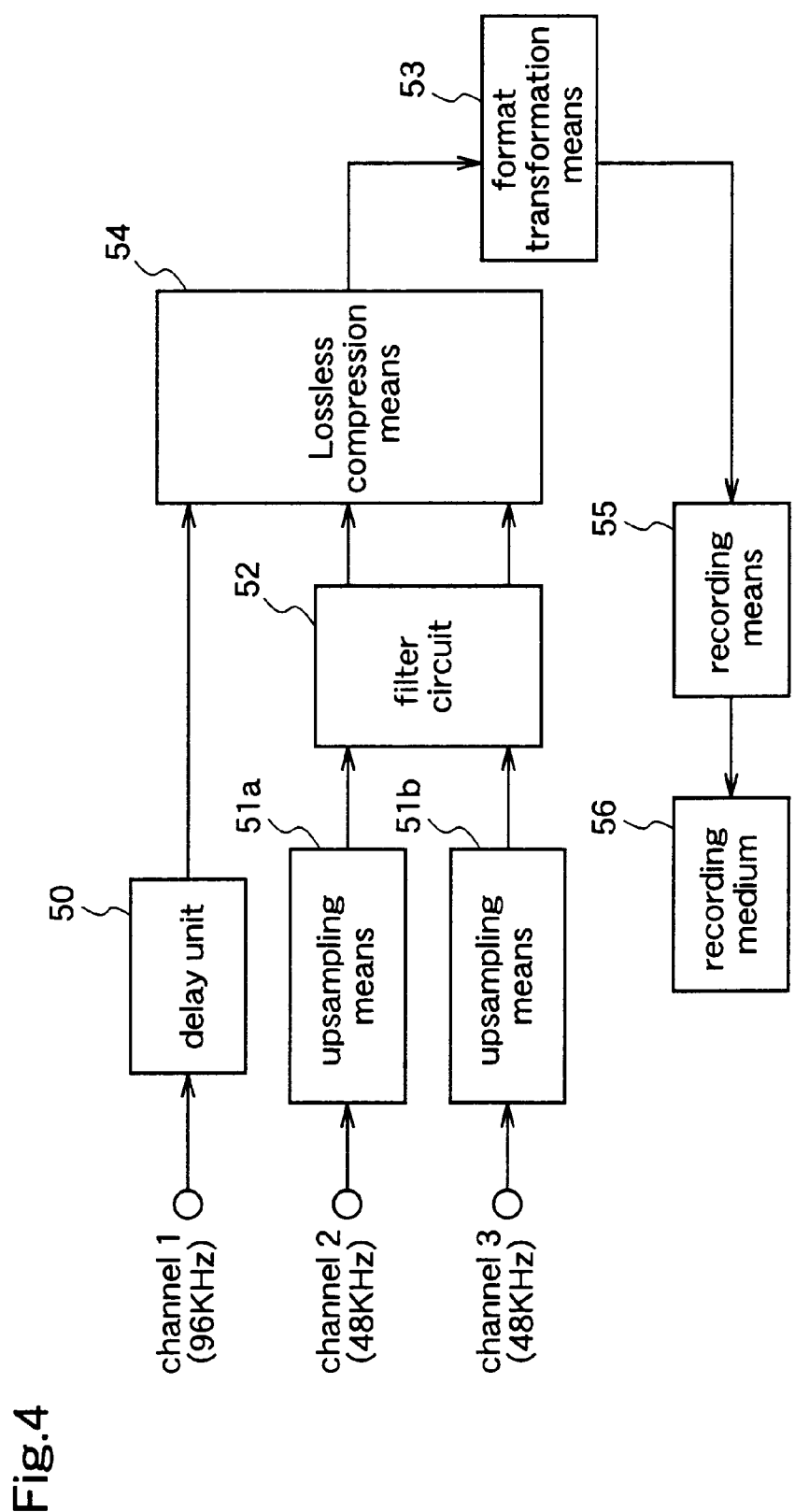
FIG. 4 is a block diagram principally showing an encoding circuit of a conventional signal processing apparatus.
Figure 5:
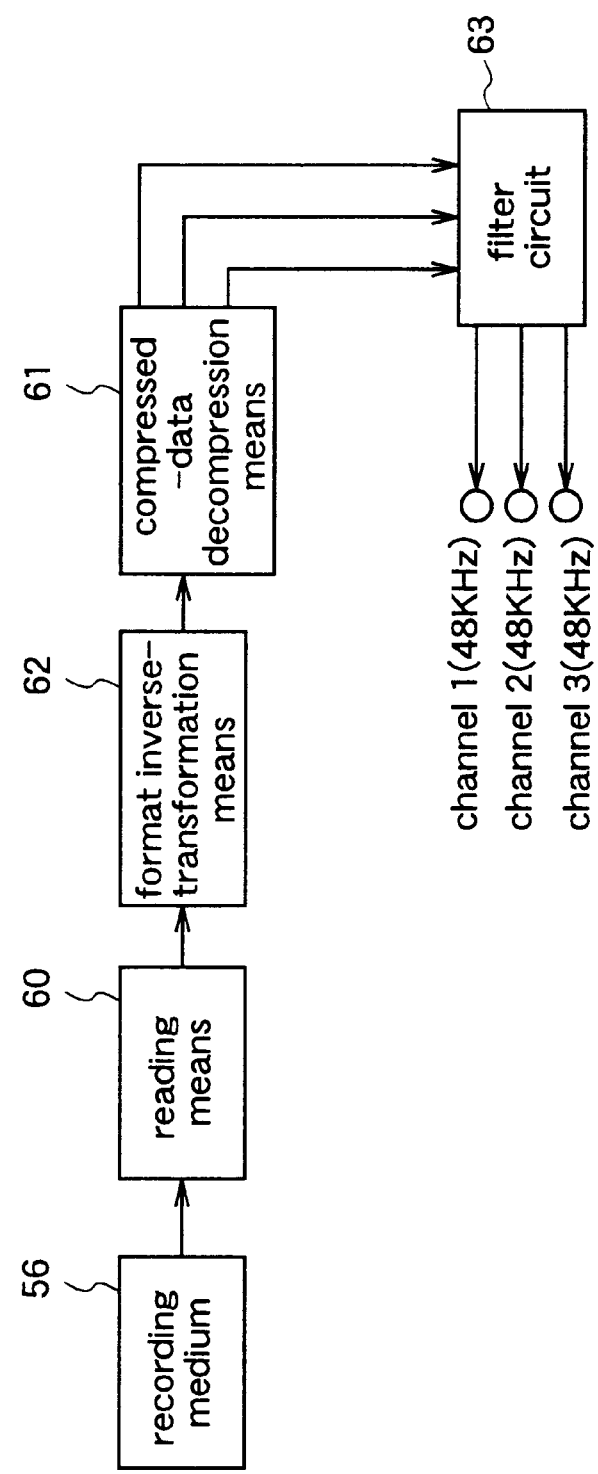
FIG. 5 is a block diagram principally showing a encoding circuit of a conventional signal processing apparatus.

To read so created data from the recording medium 8 to reproduce audio, a reproducing apparatus shown in FIG. 2 is used. In FIG. 2, reference numeral 20 denotes reading means for reading data from recording medium 8, and 21 denotes upsampling information extraction means for reading the upsampling information corresponding to the data read by the data reading means 20 from the predetermined area of the recording medium 8. Reference numeral 23 denotes format inverse-transformation means for transforming the read data (Lossless-compressed) into the Lossless-compressed audio data and header information such as the sampling frequency, and 22 denotes compressed-data decompression means for decompressing the data (Lossless-compressed) which has been subjected to the format inverse-transformation. Reference numeral 24 denotes downsampling means for downsampling the upsampled signals, and 25 denotes downsampling control means for controlling operation of the downsampling means according to the upsampling information. As an example of the above format inverse-transformation, there is transformation from the Pack/Packet structure according to the MPEG standard system to the Lossless-compressed data and the header such as the sampling frequency.

The data read from the recording medium 8 with the above construction is transformed into the Lossless-compressed audio data and the header information by the format inverse-transformation means 23, and then input to the compressed-data decompression means 22, where the Lossless-compressed data is decompressed to restore the data to their states before compression, and the resulting signals of the respective channels are output.

Then, in accordance with an instruction of the downsampling control means 25, data is intermittently read. When the data corresponding to the signals of the channels 2 and 3 are read, and flags indicating that sample data of the channels 2 and 3 are sample data before upsampling performed by the upsampling means 2a and 2b are obtained from the upsampling information extracted by the upsampling information extraction means 21, the downsampling means 24 operates so as to read only the sample data before upsampling of the signals of the channels 2 and 3.

The upsampling information output from the upsampling information extraction means 21 is input to the downsampling control means 25. The downsampling control means controls the downsampling means 24 according to the upsampling information so that it downsamples the sampling frequencies of the signals of the channels 2 and 3 which have been subjected to the format inverse-transformation from 96 KHz into 48 KHz.

Thus, in accordance with this embodiment, the upsampling information indicating whether or not data are sample data before upsampling performed by the upsampling means 2a and 2b, are generated, and the upsampled signals are filtered by the half band filter circuit 3 and then Lossless compressed, to be recorded in the recording medium 8. Therefore, operation amount in filtering when upsampling the signals can be reduced by half as compared with a case using a conventional filter. In addition, since when reproducing the data, reading is performed every other data intermittently with referring to the upsampling information, the downsampling processing at the reading can be performed by simply intermittently reading data. Hence, a filter circuit used in reproduction is dispensed with unlike the conventional example, and the operation amount in downsampling can be reduced. Further, when downsampling the signals at the reproduction, original data (sample data) can be restored completely.

While in this embodiment the upsampling information are written in the predetermined areas of the disc for each data, the areas into which data are to be inserted at upsampling may be previously determined, whether or not first data is inserted data may be uniformly decided, and on the basis of that result, intermittent reproduction may be performed by firmware processing.

While in this embodiment the half band filter is used, this may be replaced by an FIR filter or an IIR filter, which changes only the inserted sample data instead of changing original sample data in the upsampling, whereby the original data (sample data) can be completely restored by extracting only the original data in downsampling at the reproduction.

While in this embodiment the signals of the three channels are illustrated for simplicity, more channels may be used.

While in this embodiment the Lossless compression is conducted when compressing the data, the present invention is applicable to an apparatus which employs irreversible compression according to MPEG standard or an acoustic processing apparatus such as an equalizer. Also, in this case, the amount of operation by the apparatus can be reduced, because processing by the same is reduced.

Industrial Availability

The signal processing apparatus of the present invention is capable of reducing the amount of operation in decoding when reproducing a plurality of signals of different sampling frequencies.

What is claimed is:

1. A signal processing apparatus for encoding a plurality of channel signals of different sampling frequencies to be recorded in a recording medium, said apparatus comprising:

upsampling means for transforming a sampling frequency of a channel signal having a small sampling frequency among the plurality of channel signals of different sampling frequencies into a sampling frequency of a channel signal having a large sampling frequency;

a half band filter for receiving a channel signal upsampled by said upsampling means as an input and for eliminating unnecessary band signals from the received channel signal; and format transformation means for transforming a channel signal processed by said half band filter and a channel signal having the large sampling frequency into signals having predetermined formats.

2. The signal processing apparatus of claim 1, further comprising:

data compression means for performing lossless compression of a signal processed by said half band filter and a channel signal having the large sampling frequency.

3. The signal processing apparatus of claim 1, further comprising:

upsampling information description means for describing upsampling information indicating that a sample of a channel signal processed by said half band filter is a sample before upsampling performed by said upsampling means, said upsampling information to be recorded in a predetermined area of such recording medium.

4. A signal processing apparatus for performing decoding to reproduce data recorded in a recording medium without filtering such recorded data, such data being recorded in such recording medium after a sampling frequency of at least one channel signal among a plurality of channel signals having different sampling frequencies is upsampled as a resulting channel signal, and the resulting channel signal is processed by a half band filter and then transformed into a signal having a predetermined format, said apparatus comprising:

data reading means for reading data from such recording medium;

format inverse-transformation means for inversely transforming data read from said data reading means into a signal having a predetermined format;

downsampling means for downsampling a sampling frequency of a specified signal among the format inverse-transformed signals; and downsampling control means for instructing said downsampling means to read intermittently a specified signal among the format inverse-transformed signals.

5. The signal processing apparatus of claim 4, wherein said data reading means is for reading a signal that is completely reproducible data that has been subjected to lossless compression, the signal processing apparatus further comprising:

data decompression means for decompressing compressed data into decompressed data after said compressed data is subjected to format inverse-transformation.

6. The signal processing apparatus of claim 4, further comprising:

upsampling information extraction means for detecting upsampling information indicating that data is a sample before upsampling performed by said upsampling means when detecting the upsampled signal data; and downsampling control means for instructing said downsampling means to read intermittently such data according to the upsampling information.

7. The signal processing apparatus of claim 6, further comprising recording means for recording said upsampling information in a predetermined area of such recording medium as information indicating that data is a sample before upsampling performed by the upsampling means, and said downsampling means is for reading one of odd-numbered data and even-numbered data according to said upsampling information, thereby performing said intermittent reading.

* * * * *